United States Patent
Yun

(10) Patent No.: US 9,556,948 B2
(45) Date of Patent: Jan. 31, 2017

(54) ALTERNATOR DAMPER PULLEY FOR VEHICLE

(71) Applicant: HYUNDAI MOTOR COMPANY, Seoul (KR)

(72) Inventor: Jeyong Yun, Bucheon-si (KR)

(73) Assignee: Hyundai Motor Company, Seoul (KR)

( * ) Notice: Subject to any disclaimer, the term of this patent is extended or adjusted under 35 U.S.C. 154(b) by 37 days.

(21) Appl. No.: 14/559,814

(22) Filed: Dec. 3, 2014

(65) Prior Publication Data

US 2016/0091076 A1    Mar. 31, 2016

(30) Foreign Application Priority Data

Sep. 30, 2014  (KR) ........................ 10-2014-0131635

(51) Int. Cl.

| | |
|---|---|
| *F16H 9/00* | (2006.01) |
| *F16H 59/00* | (2006.01) |
| *F16H 61/00* | (2006.01) |
| *F16H 63/00* | (2006.01) |
| *F16D 3/00* | (2006.01) |
| *F16H 55/14* | (2006.01) |
| *F16H 55/36* | (2006.01) |
| *F16H 55/49* | (2006.01) |
| *F16D 41/06* | (2006.01) |

(52) U.S. Cl.
CPC ............... *F16H 55/49* (2013.01); *F16D 41/06* (2013.01); *F16H 55/36* (2013.01); *F16D 2041/0605* (2013.01); *F16H 2055/366* (2013.01)

(58) Field of Classification Search
CPC .. F16H 55/36; F16H 2055/366; F16D 41/206; F16D 7/022; F02B 67/06

USPC ........................................................ 474/94, 70
See application file for complete search history.

(56) References Cited

U.S. PATENT DOCUMENTS

| | | | | |
|---|---|---|---|---|
| 2,092,571 | A | * | 9/1937 | Cole ................... F16F 15/1428 464/68.4 |
| 4,781,659 | A | * | 11/1988 | Gebhardt .............. F16F 15/136 474/903 |
| 5,598,913 | A | * | 2/1997 | Monahan .............. F16D 41/206 192/41 S |
| 6,083,130 | A | * | 7/2000 | Mevissen ................ F02B 67/06 192/107 T |

(Continued)

FOREIGN PATENT DOCUMENTS

| | | |
|---|---|---|
| JP | 2569497 Y2 | 4/1998 |
| JP | 11-030299 A | 2/1999 |

(Continued)

*Primary Examiner* — Henry Liu
(74) *Attorney, Agent, or Firm* — McDermott Will & Emery LLP

(57) ABSTRACT

An alternator damper pulley for a vehicle includes a pulley body connected to an engine to receive a rotational power from an engine. A shaft connection portion is provided within the pulley body such that a rotational shaft of an alternator is insertedly coupled therein. A torsion spring is installed on an outer circumferential surface of the shaft connection portion to reduce a variation of the rotational power transmitted from the pulley body. A clutch is interposed between the torsion spring and the pulley body to connect or disconnect the shaft connection portion and the pulley body. A friction damper is installed to apply frictional damping force to the shaft connection portion.

8 Claims, 9 Drawing Sheets

(56) References Cited

U.S. PATENT DOCUMENTS

| | | | | |
|---|---|---|---|---|
| 6,109,227 A * | 8/2000 | Mott | ............... | F16H 7/06 123/192.2 |
| 7,591,357 B2 * | 9/2009 | Antchak | ............... | F16D 41/206 192/41 S |
| 7,618,337 B2 * | 11/2009 | Jansen | ............... | F02B 67/06 192/41 S |
| 7,931,552 B2 * | 4/2011 | Pendergrass | ............... | F16D 41/22 192/113.32 |
| 7,975,821 B2 * | 7/2011 | Antchak | ............... | F16D 7/022 192/41 S |
| 7,980,372 B2 * | 7/2011 | Wiesneth | ............... | F16D 41/12 192/104 B |
| 7,998,008 B2 * | 8/2011 | Kamdem | ............... | F16D 41/206 474/161 |
| 8,021,253 B2 * | 9/2011 | Dell | ............... | F16D 3/02 464/57 |
| 8,132,657 B2 * | 3/2012 | Antchak | ............... | F16D 7/022 192/41 S |
| 8,302,753 B2 * | 11/2012 | Antchak | ............... | F16D 41/206 192/113.32 |
| 8,313,400 B2 * | 11/2012 | Serkh | ............... | F16H 55/36 464/89 |
| 8,534,438 B2 * | 9/2013 | Antchak | ............... | F16D 41/206 192/113.32 |
| 8,678,157 B2 * | 3/2014 | Ward | ............... | F16D 7/022 192/41 R |
| 8,820,503 B2 * | 9/2014 | Schneider | ............... | F16D 41/206 192/41 S |
| 8,888,619 B2 * | 11/2014 | Antchak | ............... | F16D 7/022 474/74 |
| 8,931,610 B2 * | 1/2015 | Serkh | ............... | F16D 41/206 192/41 S |
| 8,985,293 B2 * | 3/2015 | Marion | ............... | F16D 13/76 192/113.32 |
| 9,033,832 B1 * | 5/2015 | Serkh | ............... | F16F 15/126 474/70 |
| 9,169,914 B2 * | 10/2015 | Serkh | ............... | F16H 55/36 |
| 9,181,989 B2 * | 11/2015 | Mevissen | ............... | F02B 67/06 |
| 9,206,892 B2 * | 12/2015 | Serkh | ............... | F16H 55/36 |
| 2007/0066426 A1 * | 3/2007 | Kamdem | ............... | F16D 41/206 474/94 |
| 2009/0176583 A1 * | 7/2009 | Dell | ............... | F16D 3/02 464/40 |
| 2009/0176608 A1 * | 7/2009 | Jansen | ............... | F02B 67/06 474/74 |
| 2011/0065537 A1 * | 3/2011 | Serkh | ............... | F16D 7/022 474/94 |
| 2012/0015768 A1 * | 1/2012 | Serkh | ............... | F16H 55/36 474/94 |
| 2012/0322592 A1 * | 12/2012 | Mortari | ............... | F16H 55/36 474/94 |
| 2013/0217524 A1 * | 8/2013 | Antchak | ............... | F02B 67/06 474/94 |
| 2015/0226309 A1 * | 8/2015 | Marion | ............... | B60K 25/02 474/94 |
| 2015/0285365 A1 * | 10/2015 | Michelotti | ............... | F16H 55/36 474/94 |

FOREIGN PATENT DOCUMENTS

| | | |
|---|---|---|
| JP | 2009-533610 A | 9/2009 |
| JP | 4367359 B2 | 11/2009 |
| KR | 10-2010-0092708 A | 8/2010 |
| KR | 10-2013-0080439 A | 7/2013 |
| KR | 10-2014-0000694 A | 1/2014 |

* cited by examiner

-- Related Art --

ALTERNATOR DAMPER PULLEY FOR VEHICLE

CROSS-REFERENCE TO RELATED APPLICATION

This application claims the benefit of priority to Korean Patent Application No. 10-2014-0131635 filed in the Korean Intellectual Property Office on Sep. 30, 2014, the entire contents of which are incorporated herein by reference.

TECHNICAL FIELD

The present disclosure relates to an alternator damper pulley for a vehicle and, more particularly, to an alternator damper pulley for a vehicle capable of preventing an abnormal behavior of an alternator by optimal frictional damping.

BACKGROUND

An alternator generates a power for a vehicle and interworking with a pulley of an internal combustion engine through a V-belt.

The alternator is connected to a crank shaft of the engine by the V-belt. The alternator rotates at a speed faster by about two to three times than that of revolutions per minute (RPM) of the engine due to a diameter ratio between the pulley of the crank shaft and a pulley damper of the alternator.

In an accessory belt system, such as the alternator, the pulley of the crank shaft, and a water pump have a resonance frequency, causing system vibration, degrading durability of a belt, and increasing belt tension to degrade fuel efficiency.

Thus, recently, an overrunning alternator decoupler (OAD) damper pulley isolating system vibration by inserting a spring in a shaft of the alternator within a pulley body is commonly used.

As illustrated in FIG. 1, the OAD damper pulley according to the related art includes a pulley body 10 having belt recesses 11 formed on an outer circumferential surface thereof to receive power from a pulley of an engine through a belt. A shaft connection portion 20 is provided within the pulley body 10 and allows a rotational shaft of an alternator to be insertedly coupled therein. A torsion spring 30 is installed on an outer circumferential surface of the shaft connection portion 20 to reduce a variation of driving force transmitted from the pulley body 10. A clutch 40 is interposed between the torsion spring 30 and the pulley body 10 and blocks power transmission between the shaft connection portion 20 and the pulley body 10 when the power transmitted from the engine is instantly reduced.

Accordingly, rotational power from the engine is transmitted to the pulley body 10 through the belt and subsequently passes through the clutch 40, the torsion spring 30, and the shaft connection portion 20, so as to be transmitted to the alternator.

Here, however, in the OAD damper pulley structure according to the related art, a change in engine torque transmitted from the pulley body 10 to the shaft connection portion 20 is absorbed by only elastic force of the torsion spring 30 to reduce it, having a limitation in reducing damping by only the torsion spring 30.

Further, in the OAD damper pulley structure according to the related art, if the change in the engine torque is not sufficiently absorbed to be reduced, vibrations and noise may be generated to result in degradation of NVH performance of a vehicle, and thus, an appropriate solution thereto is required.

The above information disclosed in this Background section is only for enhancement of understanding of the background of the disclosure, and therefore, it may contain information that does not form the prior art that is already known in this country to a person of ordinary skill in the art.

SUMMARY

The present disclosure has been made in an effort to provide an alternator damper pulley for a vehicle having advantages of promoting a stable behavior of an alternator and enhancing noise, vibration, and harness (NVH) performance of the vehicle by sufficiently absorbing and reducing a variation in engine torque by adding a friction damper based on friction to a spring damper based on a torsion spring.

According to an exemplary embodiment of the present inventive concept, an alternator damper pulley for a vehicle includes a pulley body connected to an engine to receive a rotational power from an engine. A shaft connection portion is provided within the pulley body such that a rotational shaft of an alternator is insertedly coupled therein. A torsion spring is installed on an outer circumferential surface of the shaft connection portion to reduce a variation of the rotational power transmitted from the pulley body. A clutch is interposed between the torsion spring and the pulley body to connect or disconnect the shaft connection portion to the pulley body. A friction damper is installed to apply a frictional damping force to the shaft connection portion.

The friction damper may include a friction plate configured to generate the frictional damping force to be tightly attached to the shaft connection portion; and a diaphragm spring pressing the friction plate toward the shaft connection portion.

The friction plate may be tightly installed on an upper surface of the shaft connection portion, and the diaphragm spring may be fastened to an upper surface of the pulley body by a plurality of fastening bolts.

The friction plate may be tightly installed on an upper surface of the shaft connection portion, an installation recess may be formed on an upper portion of the pulley body, and the diaphragm spring may be installed to be press-fit to the installation recess.

The friction damper may be integrally and rotatably installed in the pulley body, and the diaphragm spring may be integrally and rotatably installed in the shaft connection portion.

The pulley body may include a plurality of installation recesses recessed in an upper surface thereof in an axial direction and spaced apart from one another by a predetermined interval along a circumferential direction. The friction plate may include an annular plate body. A plurality of fixed protrusions outwardly extend from the plate body in a radial direction and fixedly are inserted into the installation recesses.

The diaphragm spring may include an annular spring body pressing the plate body in the axial direction. A press-fit installation portion is press-fit to the shaft connection portion in the axial direction.

When a thickness of the diaphragm spring is t and a deflection possibility amount thereof is h, h/t=1.3–1.4 and an initial installation deflection may range from 1.1 t to 1.3 t.

According to the alternator damper pulley for a vehicle of an embodiment of the present inventive concept, the friction damper based on friction, as well as the spring damper based on a torsion spring, is additionally provided to appropriately and effectively absorb and reduce a variation of torque while power is transmitted from the engine to the alternator, promoting a stable behavior of the alternator, and since vibration and noise due to an abnormal behavior of the alternator resulting from excessive torque variation are reduced, NVH performance of the vehicle can be enhanced.

In addition, a damper structure can be optimized by appropriately adjusting damping of the friction damper, and a damping effect can be stably and continuously exhibited for a long period of time.

DETAILED DESCRIPTION

Figure 1:
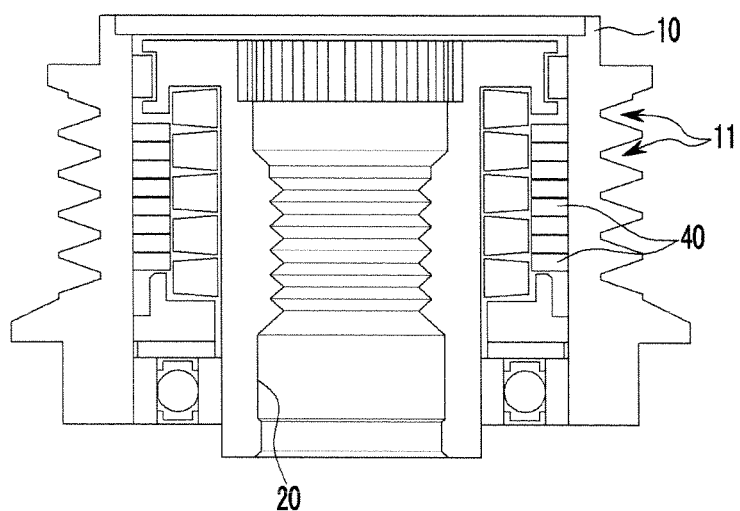
FIG. 1 is a cross-sectional view of an alternator damper pulley for a vehicle according to a related art.

Hereinafter, an exemplary embodiment of the present inventive concept will be described in detail with reference to the accompanying drawings.

The exemplary embodiment described in the present disclosure and the configuration illustrated in the drawings are merely the exemplary embodiment of the present inventive concept, rather than representing all the technical concepts of the present inventive concept, so the present disclosure is meant to cover all modifications, similarities and alternatives which are included in the spirit and scope of the present disclosure at the time of filing of the present disclosure.

Figure 2:
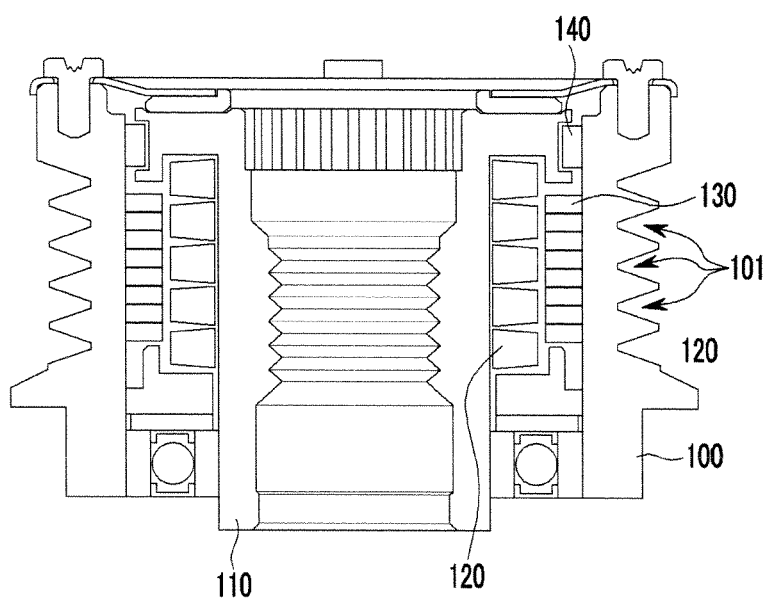
FIG. 2 is a cross-sectional view of an alternator damper pulley for a vehicle according to an exemplary embodiment of the present inventive concept.
Figure 3:
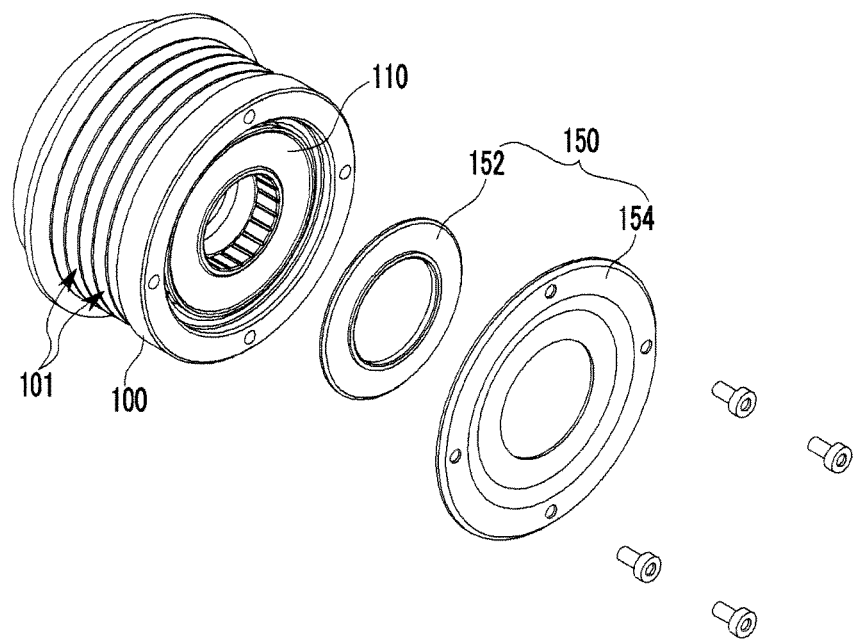
FIG. 3 is an exploded perspective view of the alternator damper pulley for a vehicle according to an exemplary embodiment of the present inventive concept.

Referring to FIGS. 2 and 3, an alternator damper pulley for a vehicle according to an exemplary embodiment of the present inventive concept may include a pulley body 100 having a plurality of belt recesses 101 formed on an outer circumferential surface thereof and spaced apart from one another in an axial direction by a predetermined interval along a circumferential direction to receive power from a pulley of an engine through a belt. A shaft connection portion 110 is connected within the pulley body 100 such that it can selectively receive torque from the pulley body 100 and allowing a rotational shaft of an alternator to be insertedly coupled therein. A torsion spring 120 is installed on an outer circumferential surface of the shaft connection portion 110 to reduce a variation of driving force transmitted from the pulley body 100. A clutch 130 is interposed between the torsion spring 120 and the pulley body 100 and blocks power transmission between the shaft connection portion 110 and the pulley body 100 when power transmitted from the engine is instantly reduced.

A bush 140 may be interposed between an upper portion of the shaft connection portion 110 and the pulley body 100.

In the damper pulley having the foregoing structure, rotational power from the engine is transmitted to the pulley body 100 through the belt, power transmitted to the pulley body 100 is transmitted to the shaft connection portion 110 through the clutch 130 and the torsion spring 120, and a rotational shaft of an alternator integrally and rotatably coupled to the shaft connection portion 110 rotates to drive the alternator.

During the power transmission process, the clutch 130 transfers rotational power of the engine transmitted from the engine to the alternator as needed, and the torsion spring 120 absorbs a variation of the rotational power or torque of the engine to a degree by elastic force thereof to reduce it.

A friction damper 150 is additionally installed in an upper portion of the shaft connection portion 110 to absorb and reduce a variation of torque transmitted from the engine to the alternator together with the torsion spring 120.

The friction damper 150 may include a friction plate 152 tightly attached to the upper surface of the shaft connection portion 110 to generate frictional damping force and a diaphragm spring 154 pressing the friction plate 152 toward the shaft connection portion 110.

The friction plate 152 may be formed of plastic and have an annular shape.

The diaphragm spring 154 may be formed of a metal and have an annular shape.

The diaphragm spring 154 may be fastened to an upper surface of the pulley body 100 through a fastening bolt in order to press the friction plate 152 toward the shaft connection portion 110.

The diaphragm spring 154 may be configured as a diaphragm spring having appropriate spring characteristics.

Figure 4:
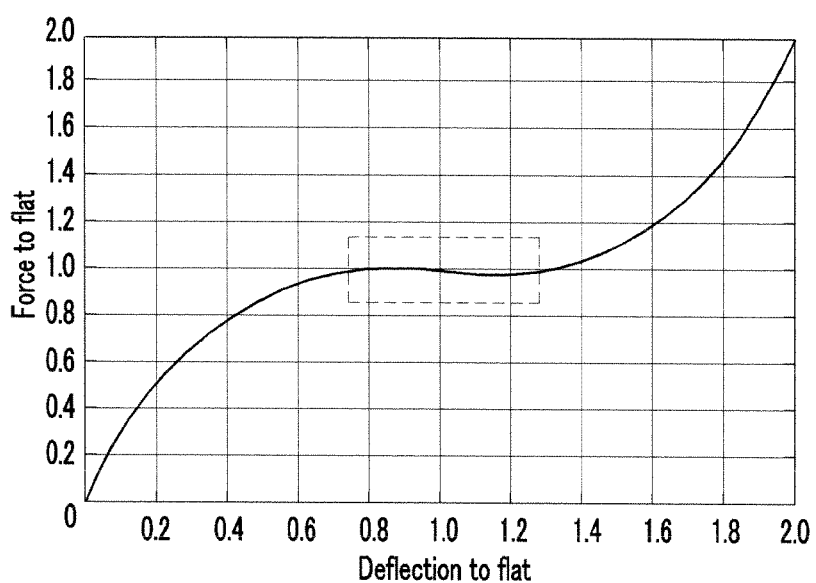
FIG. 4 is a graph illustrating characteristics of a diaphragm spring according to an exemplary embodiment of the present inventive concept.

For example, if the diaphragm spring 154 has a thickness t and a deflection possibility amount h, when $h/t \approx 1.414$, the diaphragm spring 154 has the spring characteristics as illustrated in FIG. 4, and if an installation deflection is 1.2 t when the diaphragm spring 154 is installed in the pulley body 100, even though the friction plate 152 is worn, the spring force is substantially uniformly maintained up to a certain section, and thus, a variation of the frictional damping force can be reduced.

In an exemplary embodiment of the present invention, $h/t=1.3-1.4$ and an initial installation deflection may be set to $1.1t-1.3t$.

Figure 5:
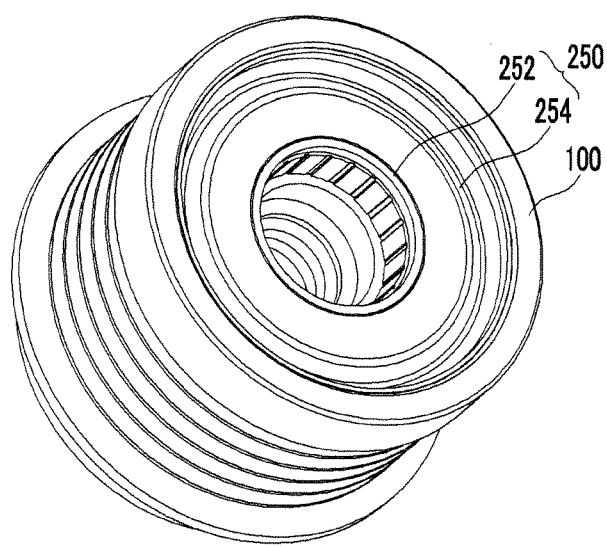
FIG. 5 is a perspective view of an alternator damper pulley for a vehicle according to another exemplary embodiment of the present inventive concept.
Figure 6:
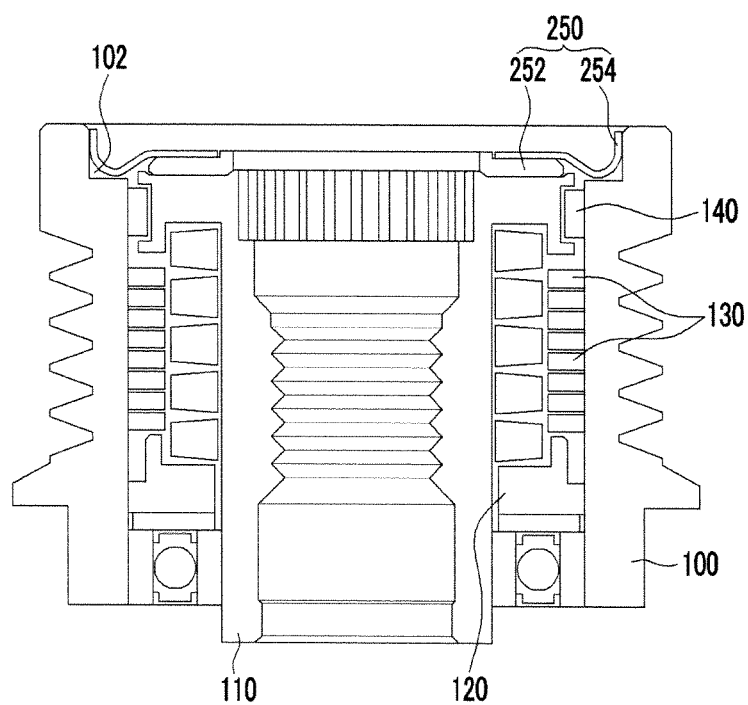
FIG. 6 is a cross-sectional view of alternator damper pulley for a vehicle according to another exemplary embodiment of the present inventive concept.

Referring to FIGS. 5 and 6, a friction damper 250 according to another exemplary embodiment of the present inventive concept includes a friction plate 252 and a diaphragm spring 254. Here, the diaphragm spring 254 is installed in an installation recess 102 formed on an upper surface of the pulley body 100 in a press-fitting manner, and the other components are identical to those of the foregoing exemplary embodiment.

Figure 7:
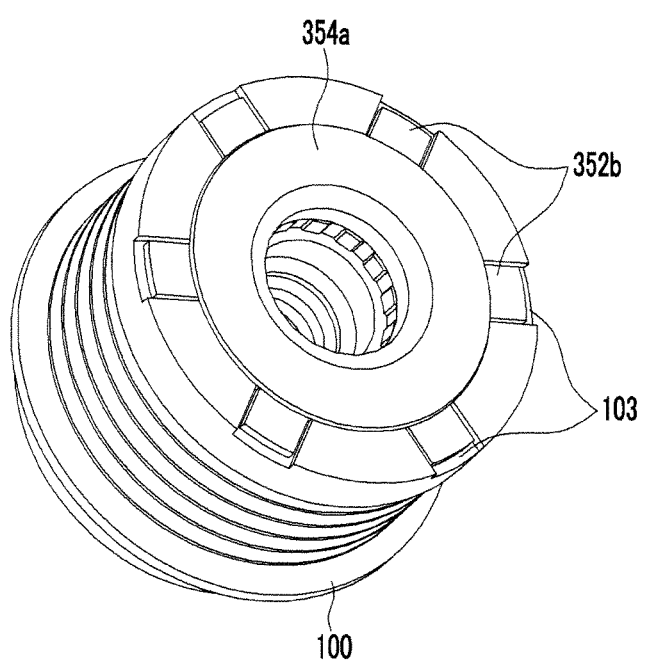
FIG. 7 is a perspective view of an alternator damper pulley for a vehicle according to another exemplary embodiment of the present inventive concept.
Figure 8:
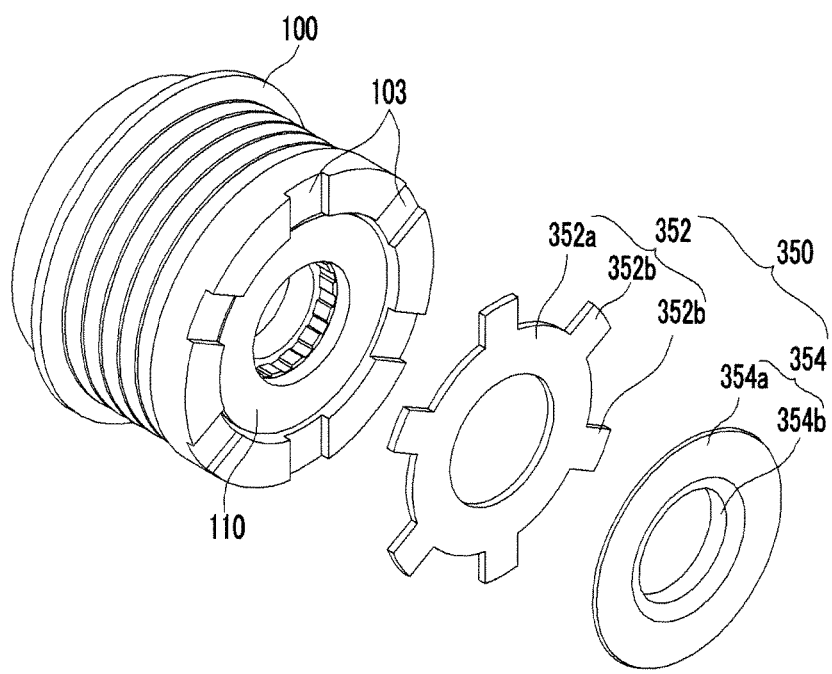
FIG. 8 is an exploded perspective view of an alternator damper pulley for a vehicle according to another exemplary embodiment of the present inventive concept.
Figure 9:
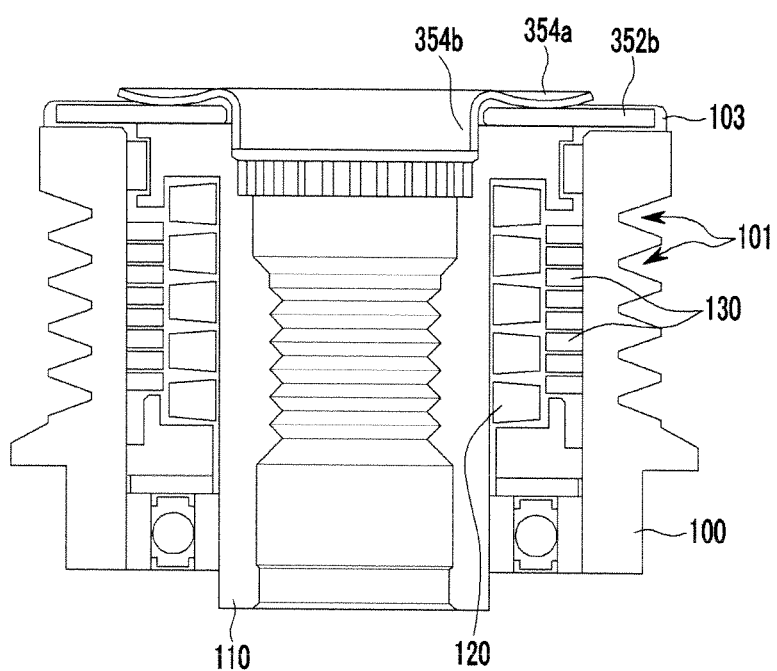
FIG. 9 is a cross-sectional view of alternator damper pulley for a vehicle according to another exemplary embodiment of the present inventive concept.

Referring to FIGS. 7 through 9, a friction damper 350 according to another exemplary embodiment of the present inventive concept includes a friction plate 352 and a diaphragm spring 354. The friction damper 350 is integrally and rotatably installed in the pulley body 100, and the diaphragm spring 354 is integrally and rotatably installed in the shaft connection portion 110.

The pulley body 110 includes a plurality of installation recesses 103 recessed in the upper surface thereof in an axial direction and spaced apart from one another by a predetermined interval along a circumferential direction, and the friction plate 352 includes an annular plate body 352a and a plurality of fixed protrusions 352b outwardly extending from the plate body 352a in a radial direction and fixedly inserted into the installation recesses 103.

The diaphragm spring 354 may include an annular spring body 354a pressing the plate body 352a in the axial direction and a press-fit installation portion 354b press-fit to the shaft connection portion 110 in the axial direction. The other components are identical to those of the foregoing exemplary embodiments.

While this inventive concept has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

What is claimed is:

1. An alternator damper pulley for a vehicle, the alternator damper pulley comprising:
    a pulley body connected to an engine to receive a rotational power from the engine;
    a shaft connection portion provided within the pulley body such that a rotational shaft of an alternator is insertedly coupled therein;
    a torsion spring installed on an outer circumferential surface of the shaft connection portion to reduce a variation of the rotational power transmitted from the pulley body;
    a clutch interposed between the torsion spring and the pulley body to connect or disconnect the shaft connection portion and the pulley body; and
    a friction damper installed to apply a frictional damping force to the shaft connection portion,
    wherein the friction damper comprises: a friction plate configured to generate the frictional damping force to be tightly attached to the shaft connection portion; and a diaphragm spring pressing the friction plate toward the shaft connection portion, and
    wherein when a thickness of the diaphragm spring is t and a deflection possibility amount thereof is h, h/t=1.3–1.4 and an initial installation deflection ranges from 1.1t to 1.3t.

2. The alternator damper pulley of claim 1, wherein the friction plate is tightly installed on an upper surface of the shaft connection portion, and the diaphragm spring is fastened to an upper surface of the pulley body by a plurality of fastening bolts.

3. The alternator damper pulley of claim 1, wherein the friction plate is tightly coupled to an upper surface of the shaft connection portion, an installation recess is formed on an upper portion of the pulley body, and the diaphragm spring is press-fit to the installation recess.

4. The alternator damper pulley of claim 1, wherein the friction damper is integrally and rotatably coupled in the pulley body, and the diaphragm spring is integrally and rotatably coupled in the shaft connection portion.

5. The alternator damper pulley of claim 4, wherein the pulley body includes a plurality of installation recesses in an upper surface thereof in an axial direction and spaced apart from one another by a predetermined interval along a circumferential direction, and the friction plate includes:
    an annular plate body; and
    a plurality of fixed protrusions outwardly extending from the plate body in a radial direction and fixedly inserted into the installation recesses.

6. The alternator of claim 5, wherein the diaphragm spring includes:
    an annular spring body pressing the plate body in the axial direction; and
    a press-fit installation portion press-fit to the shaft connection portion in the axial direction.

7. The alternator damper pulley of claim 1, wherein the pulley body has belt recesses formed on an outer circumferential surface thereof to receive a power from the engine.

8. The alternator damper pulley of claim 1, further comprising a bush interposed between an upper portion of the shaft connection portion and the pulley body.

* * * * *